US012046836B2

(12) United States Patent
Lee et al.

(10) Patent No.: US 12,046,836 B2
(45) Date of Patent: Jul. 23, 2024

(54) ANTENNA STRUCTURE AND IMAGE DISPLAY DEVICE INCLUDING THE SAME

(71) Applicants: DONGWOO FINE-CHEM CO., LTD., Jeollabuk-do (KR); KREEMO INC., Seoul (KR)

(72) Inventors: Won Hee Lee, Gyeonggi-do (KR); Dong Pil Park, Incheon (KR); Young Sub Son, Seoul (KR); In Seok Jang, Gyeonggi-do (KR); Beak Jun Seong, Gyeonggi-do (KR); Jung Woo Lee, Seoul (KR); Seong Tae Jeong, Gyeonggi-do (KR); In Kyung Hong, Seoul (KR); John Joonho Park, Gyeonggi-do (KR)

(73) Assignees: DONGWOO FINE-CHEM CO., LTD., Jeollabuk-Do (KR); KREEMO INC., Seoul (KR)

( * ) Notice: Subject to any disclaimer, the term of this patent is extended or adjusted under 35 U.S.C. 154(b) by 196 days.

(21) Appl. No.: 17/857,672

(22) Filed: Jul. 5, 2022

(65) Prior Publication Data

US 2023/0006349 A1 Jan. 5, 2023

(30) Foreign Application Priority Data

Jul. 5, 2021 (KR) ........................ 10-2021-0087566

(51) Int. Cl.
*H01Q 5/378* (2015.01)
*H01Q 1/24* (2006.01)
(Continued)

(52) U.S. Cl.
CPC ............. *H01Q 5/378* (2015.01); *H01Q 1/243* (2013.01); *H01Q 1/38* (2013.01); *H01Q 9/045* (2013.01); *H01Q 9/40* (2013.01); *H01Q 21/0025* (2013.01)

(58) Field of Classification Search
None
See application file for complete search history.

(56) References Cited

U.S. PATENT DOCUMENTS

2012/0212389 A1* 8/2012 Aizawa .................... H01Q 1/36 343/893
2020/0203848 A1* 6/2020 Tarng ....................... H01Q 9/30
(Continued)

FOREIGN PATENT DOCUMENTS

JP 2002-330025 A 11/2002
KR 10-1411444 B1 7/2014
(Continued)

*Primary Examiner* — Ab Salam Alkassim, Jr.
*Assistant Examiner* — Anh N Ho
(74) *Attorney, Agent, or Firm* — The PL Law Group, PLLC

(57) ABSTRACT

An antenna structure according to an embodiment of the present disclosure includes an antenna unit array including a plurality of antenna units, and a parasitic element disposed to be adjacent to the antenna units and to be electrically and physically separated from the antenna units. Each of the antenna units includes a radiator, and a transmission line including a first transmission line and a second transmission line connected to the radiator in different directions. The parasitic element includes a first parasitic element disposed between the first transmission line and the second transmission line included in the same antenna unit, and a second parasitic element disposed between the first transmission line and the second transmission line included in different neighboring antenna units. The second parasitic element includes a branched portion including a first branched portion and a second branched portion bent in different directions.

19 Claims, 9 Drawing Sheets

(51) Int. Cl.

| | |
|---|---|
| ***H01Q 1/38*** | (2006.01) |
| ***H01Q 9/04*** | (2006.01) |
| ***H01Q 9/40*** | (2006.01) |
| ***H01Q 21/00*** | (2006.01) |

(56) References Cited

U.S. PATENT DOCUMENTS

| | | | | |
|---|---|---|---|---|
| 2021/0143557 | A1* | 5/2021 | Patotski | H01Q 9/045 |
| 2024/0055765 | A1* | 2/2024 | Sakr | H01Q 21/065 |

FOREIGN PATENT DOCUMENTS

| | | | |
|---|---|---|---|
| KR | 10-2019-0009232 | A | 1/2019 |
| KR | 10-2021-0031355 | A | 3/2021 |
| KR | 10-2021-0050452 | A | 5/2021 |
| WO | WO 2006/038432 | A1 | 4/2006 |

* cited by examiner

ANTENNA STRUCTURE AND IMAGE DISPLAY DEVICE INCLUDING THE SAME

CROSS-REFERENCE TO RELATED APPLICATION AND CLAIM OF PRIORITY

This application claims the benefit under 35 USC § 119 Korean Patent Application No. 10-2021-0087566 filed on Jul. 5, 2021, in the Korean Intellectual Property Office (KIPO), the entire disclosure of which is incorporated herein by reference for all purposes.

BACKGROUND

1. Field

The present invention relates to an antenna structure and an image display device including the same. More particularly, the present invention relates to an antenna structure including an antenna conductive layer and a dielectric layer, and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

As mobile communication technologies have been rapidly developed, an antenna capable of operating a high frequency or ultra-high frequency communication is needed in the image display device.

For example, as various functional elements are employed in the image display device, a wide range of a frequency coverage capable of being transmitted and received by an antenna may be needed. Further, if the antenna has a plurality of polarization directions, radiation efficiency may be increased and an antenna coverage may be further increased.

However, as a driving frequency of the antenna increases, signal loss may also be increased. Further, a length of a transmission path increases, an antenna gain may be decreased. If the radiation coverage of the antenna is expanded, a radiation density or the antenna gain may be reduced to degrade radiation efficiency/reliability.

Moreover, design of an antenna that has multi-polarization and broadband properties and provides a high gain may not be easily implemented in a limited space of the image display device.

SUMMARY

According to an aspect of the present invention, there is provided an antenna structure having improved radiation property and spatial efficiency.

According to an aspect of the present invention, there is provided an image display device including an antenna structure with improved radiation property and spatial efficiency.

(1) An antenna structure, including: a dielectric layer; an antenna unit array including a plurality of antenna units on a top surface of the dielectric layer; and a parasitic element disposed to be adjacent to the antenna units and to be electrically and physically separated from the antenna units, wherein each of the antenna units includes a radiator; and a transmission line including a first transmission line and a second transmission line connected to the radiator in different directions, wherein the parasitic element comprises a first parasitic element disposed between the first transmission line and the second transmission line included in the same antenna unit; and a second parasitic element disposed between the first transmission line and the second transmission line included in different neighboring antenna units, wherein the second parasitic element includes a branched portion adjacent to the radiator, the branched portion comprising a first branched portion and a second branched portion bent in different directions, and a shortest distance between the branched portion and the radiator is from 0.4 mm to 1.2 mm.

(2) The antenna structure of the above (1), wherein the shortest distance between the branched portion and the radiator is from 0.4 mm to 1.0 mm.

(3) The antenna structure of the above (1), wherein the antenna unit array includes a first antenna unit and a second antenna unit adjacent to each other with the second parasitic element interposed therebetween, and the first branched portion is bent toward the second antenna unit, and the second branched portion is bent toward the first antenna unit.

(4) The antenna structure of the above (3), wherein a shortest distance between the first branched portion and the radiator of the second antenna unit is from 0.4 mm to 1.2 mm, and a shortest distance between the second branched portion and the radiator of the first antenna unit is from 0.4 mm to 1.2 mm.

(5) The antenna structure of the above (1), further including a third parasitic element adjacent to a lateral side of the antenna unit array.

(6) The antenna structure of the above (5), wherein the third parasitic element includes a single branched portion bent toward the radiator of an adjacent antenna unit.

(7) The antenna structure of the above (1), wherein the radiator includes convex portions and concave portions.

(8) The antenna structure of the above (7), wherein the first transmission line and the second transmission line are connected to different concave portions among the concave portions.

(9) The antenna structure of the above (8), wherein the first transmission line includes a first feeding portion and a first bent portion extending from the first feeding portion to be connected to the radiator, and the second transmission line includes a second feeding portion and a second bent portion extending from the second feeding portion to be connected to the radiator.

(10) The antenna structure of the above (9), wherein a ratio of a width of the branched portion relative to a width of the first feeding portion or the second feeding portion is from 0.6 to 1.2.

(11) The antenna structure of the above (9), wherein a ratio of a width of the branched portion relative to a width of the first feeding portion or the second feeding portion is from 0.7 to 0.9.

(12) The antenna structure of the above (7), wherein the radiator has a four-leaf clover shape or a cross shape.

(13) The antenna structure of the above (7), further including an auxiliary parasitic element adjacent to a concave portion to which the transmission line is not connected among the concave portions of the radiator, wherein the auxiliary parasitic element is electrically and physically separated from the radiator.

(14) The antenna structure of the above (13), wherein the auxiliary parasitic element comprises a first auxiliary parasitic element and a second auxiliary parasitic element which face each other with a convex portion at an upper portion of the radiator among the convex portions interposed therebetween.

(15) The antenna structure of the above (1), wherein the branched portion serves as a monopole antenna.

(16) The antenna structure of the above (1), wherein the antenna structure is a multi-band antenna driven at a plurality of resonance frequencies in a range from 10 GHz to 40 GHz.

(17) An image display device, including: a display panel; and the antenna structure according to embodiments as described above disposed on the display panel.

(18) The image display device of the above (17), further including: an intermediate circuit board including a feeding line electrically connected to the transmission line of the antenna structure; a chip mounting board disposed under the display panel; and an antenna driving integrated circuit chip mounted on the chip mounting board to apply a feeding signal to the feeding line included in the intermediate circuit board.

(19) The image display device of the above (18), wherein the parasitic element of the antenna structure is electrically separated from the intermediate circuit board.

According to embodiments of the present invention, an antenna structure may include a radiator including a plurality of convex portions and concave portions, and may include a plurality of transmission lines connected to the radiator in different directions. A plurality of polarization directions may be substantially provided by the combination of the radiator and the transmission line.

In exemplary embodiments, a parasitic element may be arranged around the transmission line. A plurality of a frequency band coverage may be provided by the addition of the parasitic element. For example, a triple-band antenna may be implemented from the antenna structure. The parasitic element may include a branched portion disposed between neighboring radiators, and may provide a stable triple-band property in an array-type antenna unit structure.

In exemplary embodiments, a length between the branched portion and the radiator may be adjusted so that gain properties may be uniformly enhanced in a plurality of frequency bands.

DETAILED DESCRIPTION OF THE EMBODIMENTS

According to exemplary embodiments of the present invention, an antenna structure in which a radiator and a parasitic element are combined to have a plurality of frequencies and a multi-polarization property is provided.

The antenna structure may be, e.g., a microstrip patch antenna fabricated in the form of a transparent film. The antenna device may be applied to communication devices for a mobile communication of a high or ultrahigh frequency band corresponding to, e.g., 3G, 4G, 5G or more.

According to exemplary embodiments of the present invention, an image display device including the antenna structure is also provided. An application of the antenna structure is not limited to the image display device, and the antenna structure may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
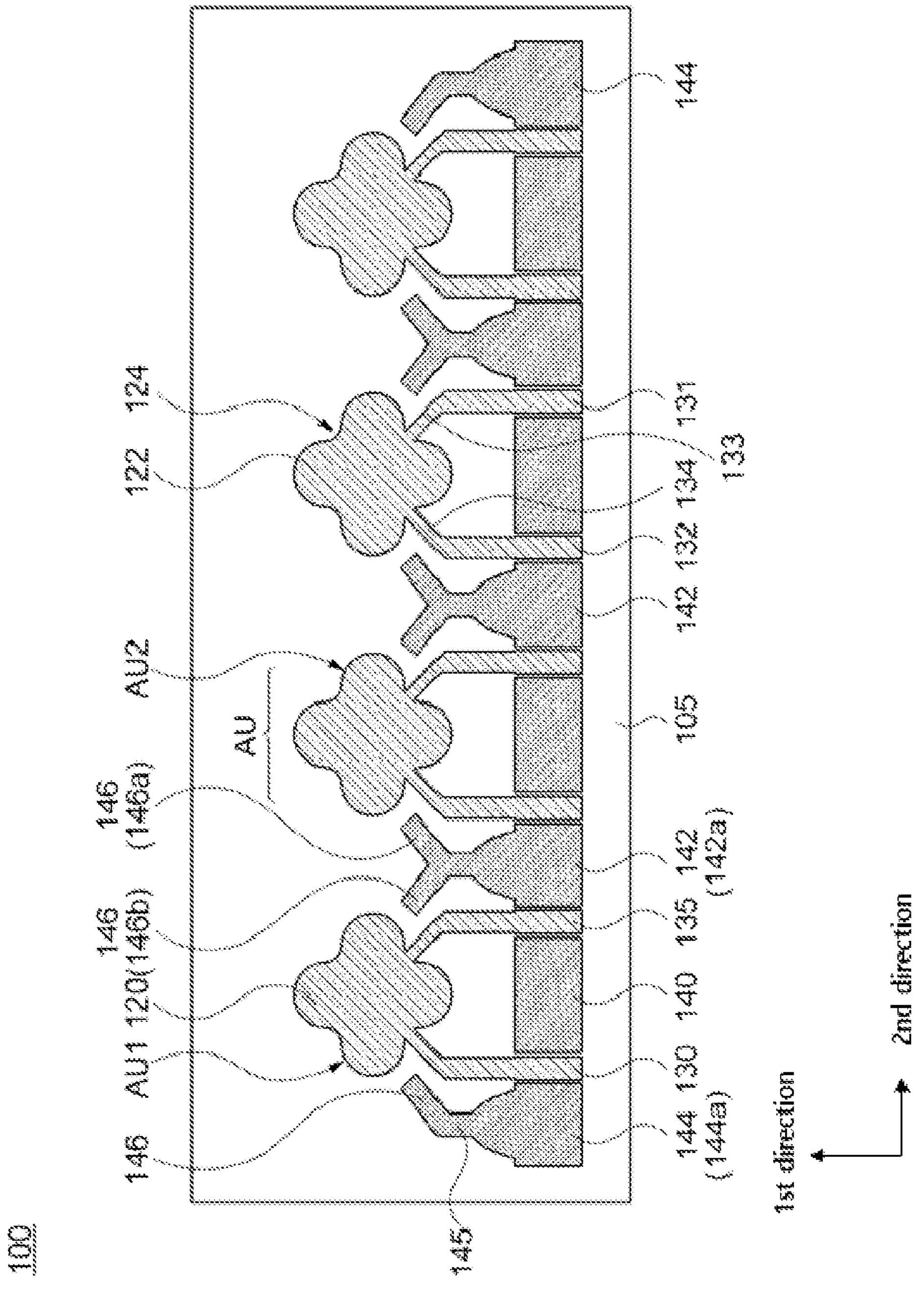
FIG. 1 is a schematic plan view illustrating an antenna structure in accordance with exemplary embodiments.
Figure 2:
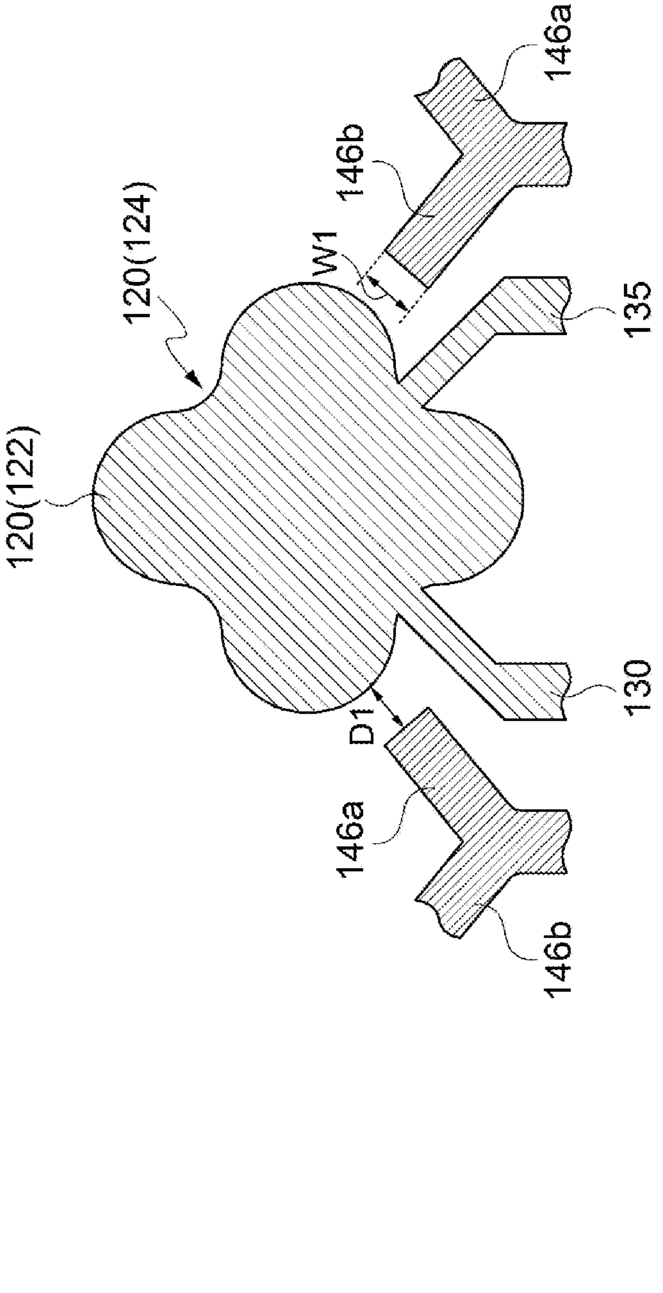
FIG. 2 is a schematic partially enlarged plan view illustrating an antenna structure in accordance with exemplary embodiments.

FIG. 1 is a schematic plan view illustrating an antenna structure in accordance with exemplary embodiments. FIG. 2 is a schematic partially enlarged plan view illustrating an antenna structure in accordance with exemplary embodiments.

In FIG. 1, two directions parallel to a top surface of a dielectric layer 105 and perpendicular to each other are defined as a first direction and a second direction. For example, the first direction may correspond to a length direction of the antenna structure, and the second direction may correspond to a width direction of the antenna structure. The definitions of the first direction and the second direction may be applied to all accompanying drawings.

Referring to FIG. 1, an antenna structure 100 may include an antenna conductive layer 110 (see FIG. 4) formed on the top surface of the dielectric layer 105.

The dielectric layer 105 may include, e.g., a transparent resin material. For example, the dielectric layer 105 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

The dielectric layer 105 may include an adhesive material such as an optically clear adhesive (OCA), an optically clear resin (OCR), or the like. In some embodiments, the dielectric layer 105 may include an inorganic insulating material such as glass, silicon oxide, silicon nitride, silicon oxynitride, etc.

In an embodiment, the dielectric layer 105 may be provided as a substantially single layer. In an embodiment, the dielectric layer 105 may include a multi-layered structure of at least two layers.

Capacitance or inductance may be formed between the antenna conductive layer 110 and a ground layer 90 (see FIG. 4) by the dielectric layer 105, so that a frequency band at which the antenna structure may be driven or operated may be adjusted. In some embodiments, a dielectric constant of the dielectric layer 105 may be adjusted in a range from about 1.5 to about 12. If the dielectric constant exceeds about 12, a driving frequency may be excessively decreased, and driving in a desired high frequency or ultrahigh frequency band may not be implemented.

The antenna conductive layer 110 may include a radiator 120, a transmission line, and a parasitic element. For example, one antenna unit AU may be defined by one radiator 120, and the transmission line and the parasitic element connected or coupled thereto.

The antenna unit AU may serve as, e.g., as an independent radiation unit operated or driven in the high frequency or ultrahigh frequency band of 3G or higher as described above.

In exemplary embodiments, the radiator 120 or a boundary of the radiator 120 may include a plurality of convex portions 122 and concave portions 124. As illustrated in FIG. 1, each of the convex portions 122 and the concave portions 124 may have a curved shape.

In exemplary embodiments, the convex portions 122 and the concave portions 124 may be alternately and repeatedly arranged along a profile of the radiator 120 in a plan view.

In some embodiments, the radiator 120 may include four convex portions 122 and may include four concave portions 124.

As illustrated in FIG. 1, the radiator 120 may have a curved cross shape. For example, the radiator 120 may have a substantially four-leaf clover shape.

In some embodiments, the radiator 120 may have, e.g., a cross shape in which two bar patterns intersect each other.

In exemplary embodiments, a plurality of transmission lines may be connected to one radiator 120. In some embodiments, a first transmission line 130 and a second transmission line 135 may be connected to the radiator 120. For example, the transmission lines may serve as a substantially unitary integral member connected with the radiator 120.

The first transmission line 130 and the second transmission line 135 may be arranged symmetrically with each other. For example, the first transmission line 130 and the second transmission line 135 may be disposed to be symmetrical to each other based on a central line of the radiator 120 in the first direction.

Each of the transmission lines may include a feeding portion and a bent portion. The first transmission line 130 may include a first feeding portion 132 and a first bent portion 134, and the second transmission line 135 may include a second feeding portion 131 and a second bent portion 133.

Figure 5:
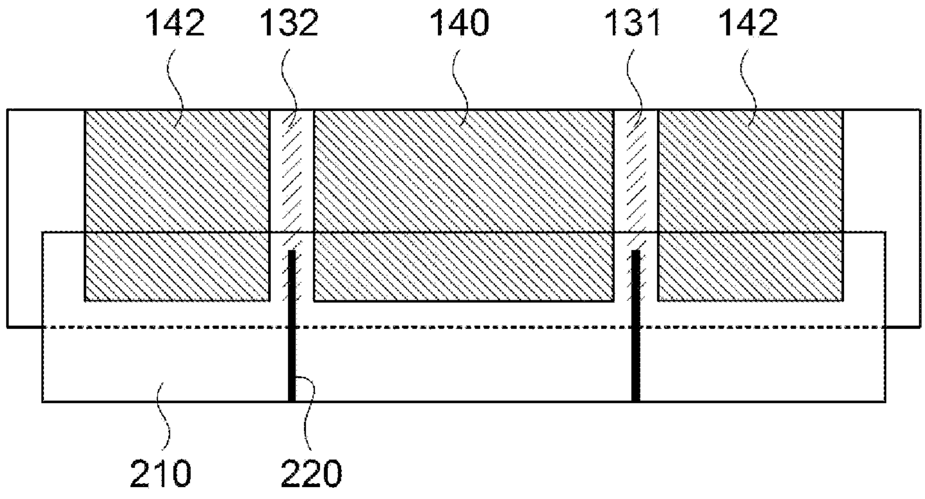
FIG. 5 is a schematic partially enlarged plan view for describing an antenna package in accordance with exemplary embodiments.

Each of the first feeding portion 132 and the second feeding portion 131 may be electrically connected to a feeding line included in a circuit board such as, e.g., a flexible printed circuit board (FPCB) (see FIG. 5). In some embodiments, the first feeding portion 132 and the second feeding portion 131 may extend in the first direction. The first feeding portion 132 and the second feeding portion 131 may be substantially parallel to each other.

The first bent portion 134 and the second bent portion 133 may be bent in directions toward the radiator 120 from the first feeding portion 132 and the second feeding portion 131, respectively, and may be directly connected to or in a direct contact with the radiator 120.

The first bent portion 134 and the second bent portion 133 may extend in different directions from each other to be connected to the radiator 120. In some embodiments, an angle between extending directions of the first bent portion 134 and the second bent portion 133 may be substantially about 90°.

For example, the first bent portion 134 may be inclined by 45° in a clockwise direction with respect to the first direction. The second bent portion 133 may be inclined by 45° in a counterclockwise direction with respect to the first direction.

Preferably, the first bent portion 134 and the second bent portion 133 may each extend toward a center of the radiator 120.

According to the structure and arrangement of the bent portions 133 and 134 as described above, feeding may be performed in substantially two orthogonal directions to the radiator 120 through the first transmission line 130 and the second transmission line 135. Accordingly, a dual polarization property may be implemented from one radiator 120.

For example, a vertical radiation and a horizontal radiation properties may be implemented together from the radiator 120.

In some embodiments, the bent portions 133 and 134 may be connected to the concave portions 124 of the radiator 120. As illustrated in FIG. 1, the first bent portion 134 and the second bent portion 133 may be connected to different concave portions 124.

In an embodiment, the first bent portion 134 and the second bent portion 133 may be connected to lower concave portions 124 of four concave portions with respect to a central line extending in the second direction of the radiator 122 in the plan view. The term "lower" herein may refer to a portion or a region adjacent to the feeding portions 131 and 132 with respect to the central line extending in the second direction of the radiator 122.

In exemplary embodiments, the antenna structure 100 may include a plurality of the antenna units AU. For example, the plurality of the antenna units AU may be arranged to be spaced apart from each other by a predetermined distance along the second direction to form an antenna unit array.

The plurality of the antenna units AU may be disposed in an array structure, so that an overall gain obtained from the antenna structure 100 may be improved. A distance between adjacent antenna units AU may be adjusted in consideration of a radiation independence of each antenna unit AU and a gain improvement.

For example, the distance between the adjacent antenna units AU (e.g., a distance between centers of the radiator 120) may be adjusted within a range of a half wavelength ($\lambda/2$) to 1.5 wavelengths ($3/2\lambda$) corresponding to a maximum resonance frequency.

The antenna structure 100 according to exemplary embodiments may include parasitic elements 140, 142 and 144 physically separated from the radiator 120 and the transmission lines 130 and 135.

The parasitic elements may be disposed to be adjacent to the transmission lines 130 and 135, and may be physically and electrically separated from the transmission lines 130 and 135.

The parasitic elements 140, 142 and 144 may be positioned at the lower region with respect to the central line extending in the second direction of the radiator 122 and disposed around the transmission lines 130 and 135. The parasitic elements 140, 142 and 142 may include a first parasitic element 140, a second parasitic element 142 and a third parasitic element 144.

The first parasitic element 140 may be disposed between the first transmission line 130 and the second transmission line 135. In an embodiment, the first parasitic element 140 may be disposed between the first feeding portion 132 and the second feeding portion 131.

The first parasitic element 140 may be provided for each antenna unit AU, and may be included as an independent element of each antenna unit AU.

The second parasitic element 142 may be disposed between different neighboring antenna units AU. In exemplary embodiments, the second parasitic element 142 may be disposed between the first feeding portion 132 and the second feeding portion 131 included in different neighboring antenna units AU.

For example, the neighboring antenna units AU may share the second parasitic element 142 in common.

The third parasitic element 144 may be disposed to be adjacent to both lateral ends of the antenna unit array.

Each of the parasitic elements 140, 142 and 144 has a floating pattern shape separated from the radiator 120 and the transmission lines 130 and 135, and may extend in the first direction.

In exemplary embodiments, the second parasitic element 142 may include a branched portion 146. For example, the second parasitic element 142 may include a second parasitic body **142*a* between the adjacent first and second feeding portions 132 and 131, and the branched portion 146 may be connected to the second parasitic body 142*a* by a connecting portion 145**.

The branched portion 146 of the second parasitic element 142 may include a first branched portion **146*a* and a second branched portion 146*b* bent in different directions. For example, the first branched portion 146*a* may be bent in a clockwise direction with respect to the first direction. The second branched portion 146*b*** may be bent in a counterclockwise direction with respect to the first direction.

The first branched portion **146*a* and the second branched portion 146*b* may each be bent toward the adjacent radiator 120 (e.g., toward a center of the radiator 120). For example, a first antenna unit AU1 and a second antenna unit AU2 may be adjacent to each other in the second direction with the second parasitic element 142 interposed therebetween. The first branched portion 146*a* may be bent toward the radiator 120 included in the second antenna unit AU2. The second branched portion 146*b* may be bent toward the radiator 120 included in the first antenna unit AU1**.

The first branched portion **146*a* and the second branched portion 146*b* may be integrally coupled to one second parasitic element 142 through the connecting portion 145. Thus, a coupling effect may be simultaneously implemented through one second parasitic element 142 to the first antenna unit AU1 and the second antenna unit AU2** adjacent to each other.

Referring to FIG. 2, a shortest distance D1 between the branched portion **146*a* and 146*b* and the radiator 120 may be from 0.4 mm to 1.2 mm. The shortest distance D1 may be a distance between the branch portion 146*a* and 146*b* and the radiator 120 in an extending direction of the branched portion 146*a* and 146*b***.

Within the range of the shortest distance D1, the antenna gain may be uniformly improved in a plurality of resonance frequency bands. For example, if the shortest distance D1 is less than 0.4 mm, the gain in the maximum resonance frequency band of the antenna structure 100 may be excessively reduced. If the shortest distance D1 exceeds 1.2 mm, a common coupling effect for the first and second antenna units AU1 and AU2 may not be substantially implemented.

Preferably, the shortest distance D1 may be from 0.4 mm to 1.0 mm, more preferably from 0.6 mm to 1.0 mm.

In some embodiments, a ratio of a width of each of the branched portions **146*a* and 146*b* relative to a maximum width of each of the first transmission line 130 (e.g., the first feeding portion 132) and the second transmission line 135 (e.g., the second feeding portion 131**) may be from 0.6 to 1.2, preferably from 0.7 to 0.9, more preferably 0.75 to 0.85.

Within the above-described width range, a monopole antenna effect may be substantially added to the antenna structure without degrading the common coupling effect for the first and second antenna units AU1 and AU2 through the branched portions **146*a* and 146*b***.

The third parasitic element 144 may include a third parasitic body **144*a* adjacent to the first feeding portion 132 or the second feeding portion 131, and may include a branched portion 146 connected to the third parasitic body 144*a* via the connecting portion 145**.

The branched portion 146 of the third parasitic element 144 may also be bent toward the adjacent radiator 120. In exemplary embodiments, the branched portion 146 of the third parasitic element 144 may have a single branch shape.

According to the above-described exemplary embodiments, the radiator 120 may be formed to include the convex portion 122 and the concave portion 124, and the first and second transmission lines 130 and 135 may be connected to different concave portions 124 of the radiator 120 in intersecting directions.

The dual polarization property may be implemented from the radiator 120 by the above-described dual transmission line structure.

The parasitic elements 140, 142 and 144 may be provided as floating elements that may not be connected to other conductors, and may be adjacent to the radiator 120 and the transmission lines 130 and 135 to serve as an auxiliary radiator having a monopole antenna shape. Accordingly, multi-band antenna properties may be implemented with the improved gain by the combination with the structures of the radiator 120 and the transmission lines 130 and 135 as described above.

As described above, a spacing distance of the branched portion 146 included in the second and third parasitic elements 142 and 144 may be adjusted so that a substantially multi-band antenna may be implemented without an excessive gain reduction at any frequency band of the plurality of the frequency bands.

Thus, a resolution of different resonance frequency bands may be improved, and the antenna structure 100 may be provided as an effective multi-band antenna. Additionally, a signal enhancement and a multi-band formation in a low frequency band and a high frequency band may be uniformly implemented.

In some embodiments, feeding signals having different phases may be applied to the first and second transmission lines 130 and 135. For example, a first feeding signal and a second feeding signal having a phase difference from about 120° to 200°, preferably from 120° to 180°, more preferably about 180° may be applied to the first and second transmission lines 130 and 135, respectively.

The antenna structure 100 may be provided as a broadband antenna operable in a multi-resonance frequency band by the combination of the phase difference signaling, the dual transmission line structure and the shape of the radiator 120.

In some embodiments, the antenna structure 100 may serve as a triple band antenna. For example, three resonance frequency peaks in a range from 10 GHz to 40 GHz or from 20 GHz to 40 GHz may be provided from the antenna structure 100.

In an embodiment, a first resonance frequency peak in a range of 20 GHz to 25 GHz, a second resonance frequency peak in a range of 27 GHz to 35 GHz, and a third resonance frequency peak in a range of 35 GHz to 40 GHz may be implemented from the antenna structure 100.

The antenna conductive layer 110 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in a combination of at least two therefrom.

For example, the antenna conductive layer 110 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna conductive layer 110 may include a transparent conductive oxide such as indium tin oxide (ITO), indium zinc oxide (IZO), indium zinc tin oxide (ITZO), zinc oxide (ZnOx), etc.

In some embodiments, the antenna conductive layer 110 may include a stacked structure of a transparent conductive oxide layer and a metal layer. For example, the antenna unit may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In an embodiment, the antenna conductive layer 110 may include a metamaterial.

In some embodiments, the antenna conductive layer 110 (e.g., the radiator 120) may include a blackened portion, so that a reflectance at a surface of the antenna conductive layer 110 may be decreased to suppress a visual pattern recognition due to a light reflectance.

In an embodiment, a surface of the metal layer included in the antenna conductive layer 110 may be converted into a metal oxide or a metal sulfide to form a blackened layer. In an embodiment, a blackened layer such as a black material coating layer or a plating layer may be formed on the antenna conductive layer 110 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

The radiator 120, the transmission lines 130 and 135, and the parasitic elements 140, 142 and 144 may all be disposed at the same level or at the same layer on the top surface of the dielectric layer 105. In an embodiment, the radiator 120, the transmission lines 130 and 135, and the parasitic elements 140, 142 and 144 may all be formed by patterning the same conductive layer.

In some embodiments, a ground layer 90 (see FIG. 4) may be disposed on a bottom surface of the dielectric layer 105. The ground layer 90 may overlap the radiator 120.

In an embodiment, a conductive member of an image display device or a display panel 405 to which the antenna structure 100 is applied may serve as the ground layer 90. For example, the conductive member may include various electrodes or wirings such as, e.g., a gate electrode, a source/drain electrode, a pixel electrode, a common electrode, a scan line, a data line, etc., included in a thin film transistor (TFT) array panel.

In an embodiment, a metallic member disposed at a rear portion of the image display device such as a SUS plate, a sensor member (e.g., a digitizer), a heat dissipation sheet, etc., may serve as the ground layer 90.

In some embodiments, the radiator 120 may be disposed in a display area of the image display device, and may have a mesh structure. Accordingly, the antenna unit may be prevented from being visually recognized by a user in the display area, and transmittance may be enhanced.

In some embodiments, at least a portion of the transmission lines 130 and 135 may have a mesh structure. For example, the bent portions 133 and 134 of the transmission lines 130 and 135 may include the mesh structure.

The feeding portions 131 and 132 of the transmission lines 130 and 135 may have a solid metal pattern structure. Accordingly, a feeding efficiency transmitted to the radiator 120 may be improved. In an embodiment, a portion of the feeding portion 131 and 132 that is bonded to the feeding line 220 may have the solid metal pattern structure, and a remaining portion may have the mesh structure.

The parasitic elements 140, 142 and 144 have a solid metal pattern structure, and thus multi-band implementation or auxiliary radiation generation efficiency may be improved. In an embodiment, portions (e.g., the branched portion 146) of the parasitic elements 140, 142 and 144 may have a mesh structure.

Figure 3:
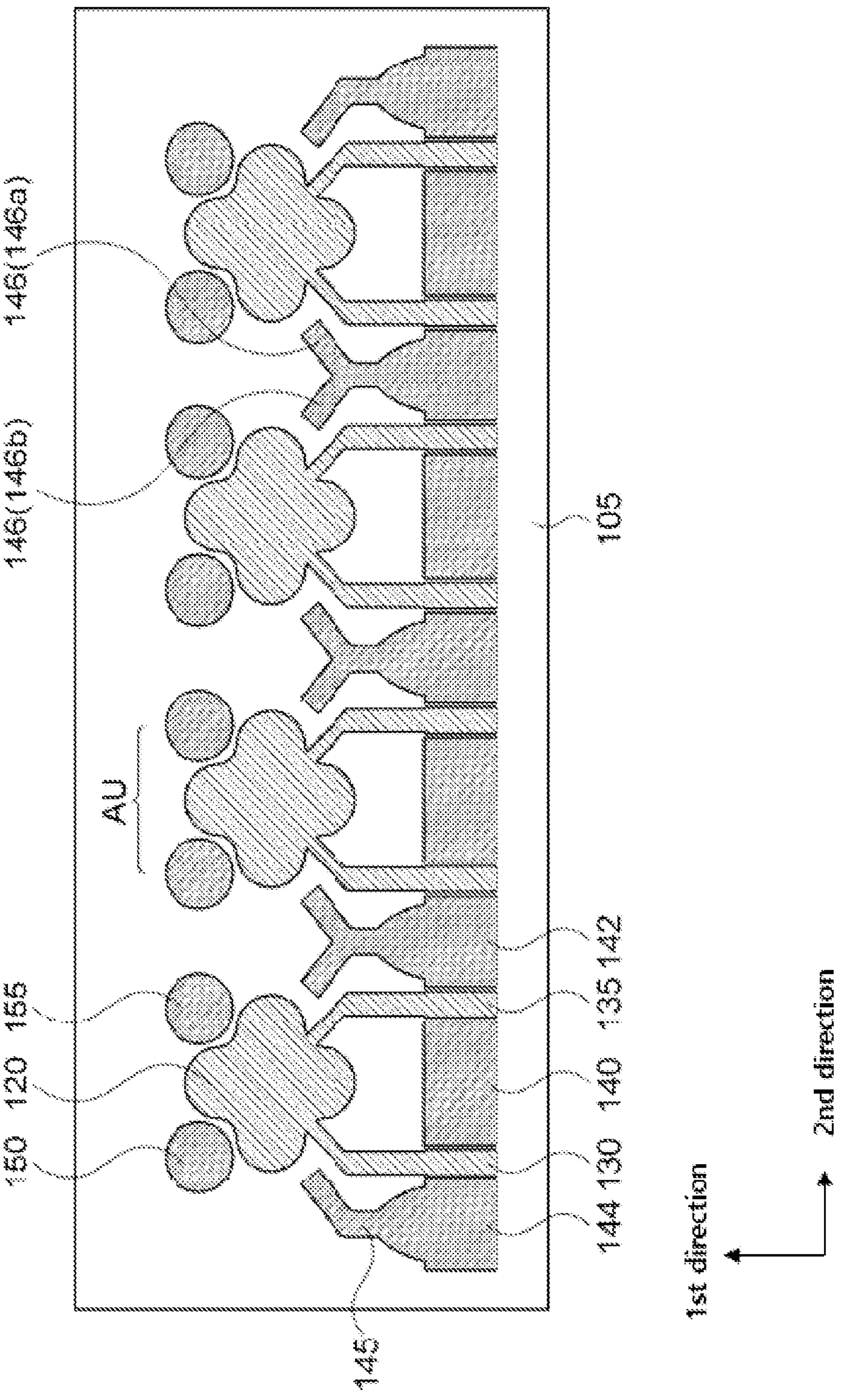
FIG. 3 is a schematic plan view illustrating an antenna structure in accordance with some exemplary embodiments.

FIG. 3 is a schematic plan view illustrating an antenna structure in accordance with some exemplary embodiments. Detailed descriptions on elements and structures substantially the same as or similar to those described with reference to FIG. 1 are omitted herein.

Referring to FIG. 3, the antenna structure 100 may further include auxiliary parasitic elements 150 and 155. The auxiliary parasitic elements 150 and 155 may be provided per each antenna unit AU included in the antenna array.

The auxiliary parasitic elements 150 and 155 may be disposed at an upper region based on the central line of the radiator 120 in the second direction. The term "upper" may refer to a portion or a region that is away from the feeding portions 131 and 132 or opposite to the feeding portions 131 and 132 with respect to the central line extending in the second direction of the radiator 120 in the planar view.

The auxiliary parasitic elements 150 and 155 may be disposed to be adjacent to the radiator 120. In exemplary embodiments, the auxiliary parasitic elements 150 and 155 may be adjacent to the concave portions 124 included in an upper portion of the radiator 120.

For example, the auxiliary parasitic elements 150 and 155 may be partially disposed in recesses formed by the concave portions 124.

The auxiliary parasitic element may include a first auxiliary parasitic element 150 and a second auxiliary parasitic element 155. The first auxiliary parasitic element 150 and the second auxiliary parasitic element 155 may be disposed to be adjacent to different concave portions 124 of the radiator 120.

In some embodiments, the first auxiliary parasitic element 150 and the second auxiliary parasitic element 155 may face each other with the convex portion 122 included in the upper portion of the radiator 120 interposed therebetween.

The auxiliary parasitic elements 150 and 155 may be provided in a floating pattern or an island pattern adjacent to the radiator 120, and may enhance a radiation gain of each resonance frequency in the multi-band radiation implemented by the radiator 120.

Accordingly, a discrimination between resonance frequencies or resonance peaks included in the multi-band radiation may be improved, and a multi-band antenna having a sufficient gain may be provided.

In an embodiment, as illustrated in FIG. 3, the first auxiliary parasitic element 150 and the second auxiliary parasitic element 155 may have a substantially circular shape.

In an embodiment, the first auxiliary parasitic element 150 and the second auxiliary parasitic element 155 may have a substantially quadrangular shape, preferably a square shape.

The auxiliary parasitic elements 150 and 155 may be disposed in the display area of the image display device together with the radiator 120. In some embodiments, the auxiliary parasitic elements 150 and 155 may include a mesh structure together with the radiator 120 to have improved transmittance and to be prevented from being viewed by the user.

The shape of the auxiliary parasitic elements 150 and 155 may be properly modified (e.g., an elliptical shape or a polygonal shape) according to the shape of the radiator 120.

Figure 4:
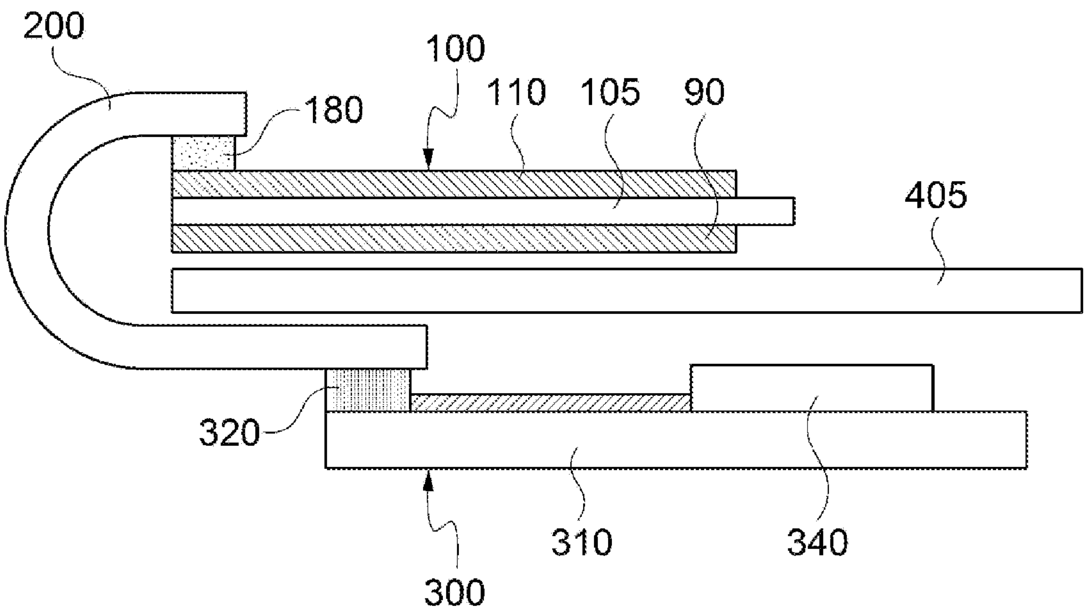
FIG. 4 is a schematic cross-sectional view illustrating an antenna package and an image display device in accordance with exemplary embodiments.
Figure 6:
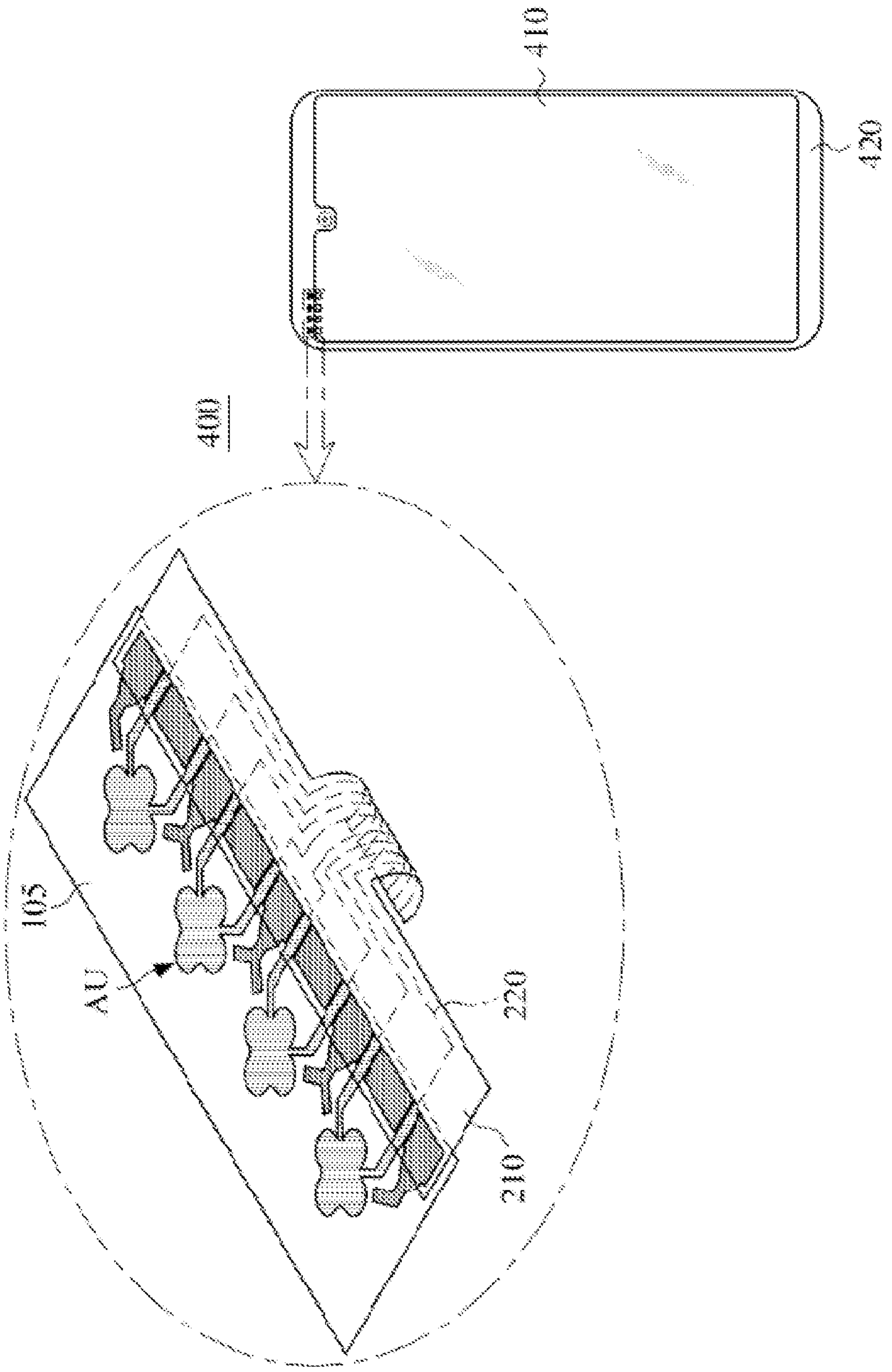
FIG. 6 is a schematic plan view for describing an image display device in accordance with example embodiments.

FIG. 4 is a schematic cross-sectional view illustrating an antenna package and an image display device in accordance with exemplary embodiments. FIG. 5 is a schematic partially enlarged plan view for describing an antenna package in accordance with exemplary embodiments. FIG. 6 is a schematic plan view for describing an image display device in accordance with example embodiments.

Referring to FIGS. 4 to 6, an image display device 400 may be fabricated in the form of, e.g., a smart phone, and FIG. 6 illustrates a front portion or a window surface of the image display device 400. The front portion of the image display device 400 may include a display area 410 and a peripheral area 420. The peripheral area 420 may correspond to, e.g., a light-shielding portion or a bezel portion of the image display device.

The above-described antenna structure 100 may be combined with an intermediate circuit board 200 to form an antenna package. The antenna structure 100 included in the antenna package may be disposed toward the front portion of the image display device 400. For example, the antenna structure 100 may be disposed on a display panel 405. The radiator 120 may be disposed on the display area 410 in a plan view.

In this case, the radiator 120 may include the mesh structure, and a reduction of transmittance due to the radiator 120 may be prevented. The parasitic elements and the feeding portions included in the antenna structure 100 may include a solid metal pattern, and may be disposed on the peripheral region 420 to prevent a degradation of an image quality. In some embodiments, the branched portion 146 adjacent to the radiator may include the mesh structure.

In some embodiments, the intermediate circuit board 200 may be bent to be disposed at a rear portion of the image display device 400 and extend toward a chip mounting board 300 on which an antenna driving IC chip 340 is mounted.

The intermediate circuit board 200 and the chip mounting board 300 may be coupled to each other by a connector 320 to be included in the antenna package. The connector 320 and the antenna driving IC chip 340 may be electrically connected via a connection circuit 310.

For example, the intermediate circuit board 200 may be a flexible printed circuit board (FPCB). The chip mounting board 300 may be a rigid printed circuit board (Rigid PCB).

As illustrated in FIG. 5, the intermediate circuit board 200 may include a core layer 210 including a flexible resin and feeding lines 220 formed on the core layer 210. Each of the feeding lines 220 may be attached and electrically connected to the first feeding portion 132 and the second feeding portion 131 by a conductive intermediate structure 180 (see FIG. 4) such as an anisotropic conductive film (ACF).

Terminal end portions of the first feeding portion 132 and the second feeding portion 131 bonded to the feeding lines 220 may serve as a first antenna port and a second antenna port, respectively. A feeding signal may be applied from the antenna driving IC chip 340 through the first antenna port and the second antenna port.

As described above, the feeding signal having a phase difference (e.g., 180° phase difference) may be applied to the radiator 120 through the first antenna port and the second antenna port to implement the multi-band antenna.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Figure 7:
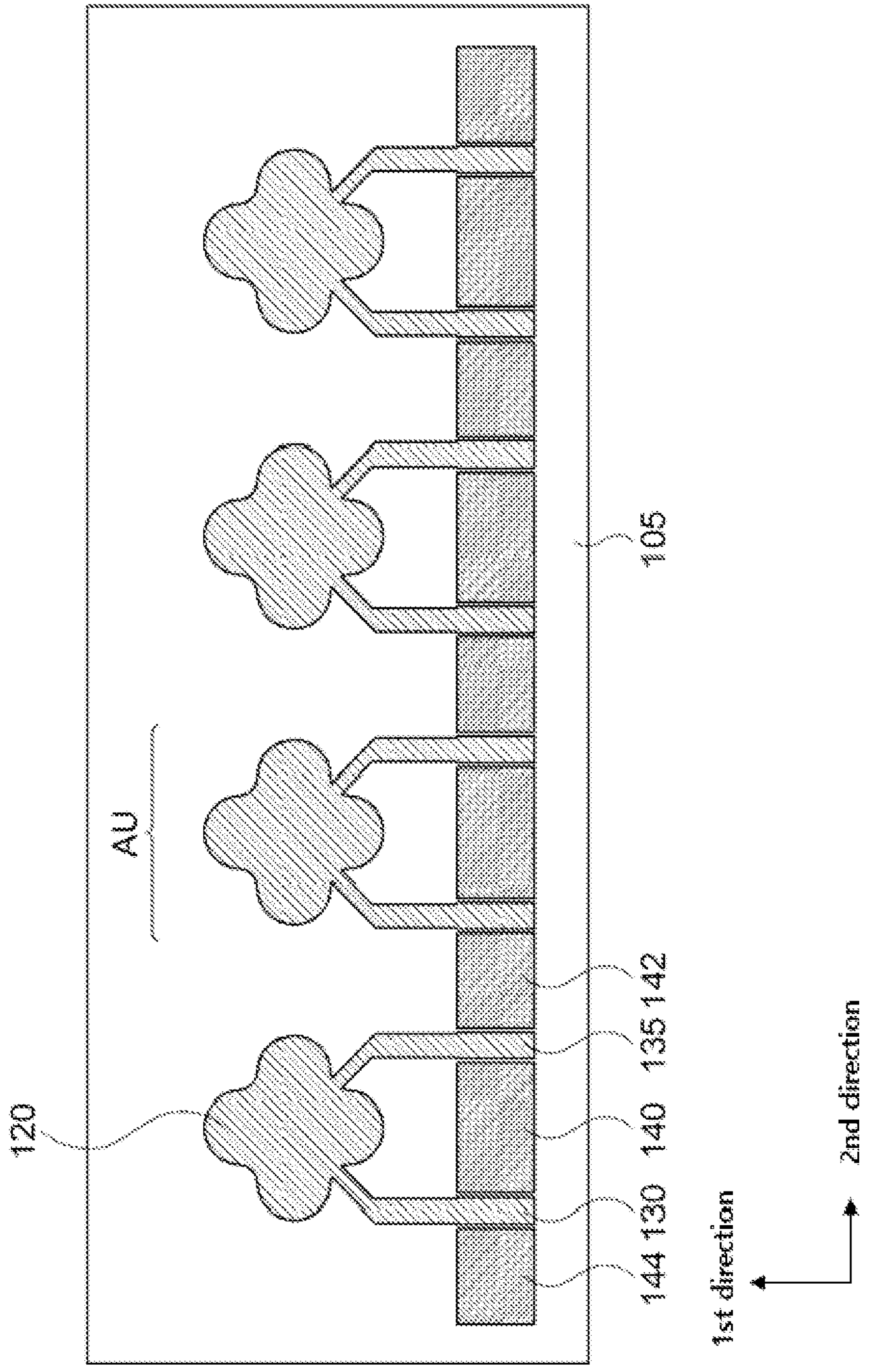
FIG. 7 is a plan view illustrating an antenna structure in accordance with Comparative Example.
Figure 8:
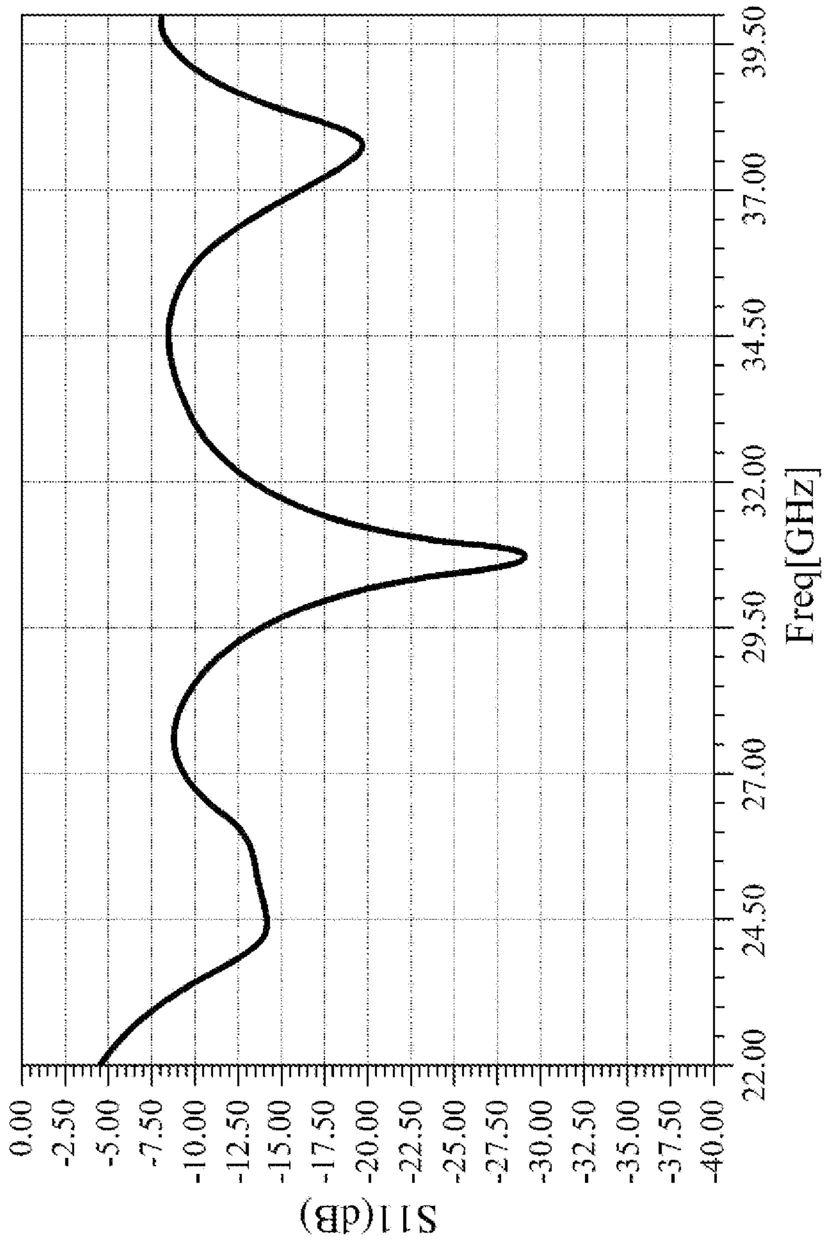
FIGS. 8 and 9 are graphs showing radiation properties of antenna structures according to Comparative Example and Example, respectively.
Figure 9:
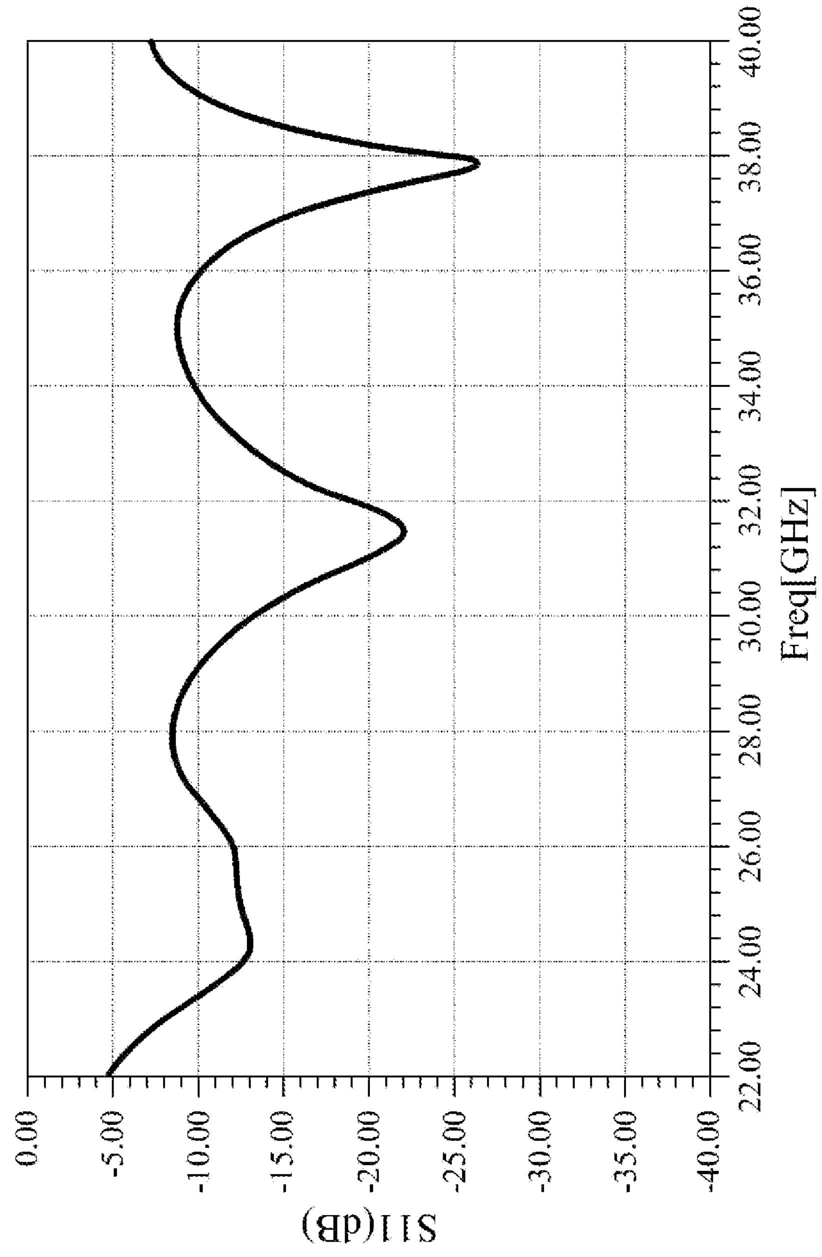

EXPERIMENTAL EXAMPLE (1) Evaluation on Multi-Band Generation by Addition of Parasitic Elements FIG. 7 is a plan view illustrating an antenna structure in accordance with Comparative Example. FIGS. 8 and 9 are graphs showing radiation properties of antenna structures according to Comparative Example and Example, respectively.

As illustrated in FIG. 7, an antenna structure of Comparative Example in which a branched portion was omitted in a parasitic element was manufactured, and an antenna structure of Example as illustrated in FIG. 1 was manufactured.

A COP film was commonly used as the dielectric layer 105, and the antenna conductive layer was formed using an APC alloy. Each length of the first parasitic element 140, the second parasitic element 142 (the second parasitic body 142*a*) and the third parasitic element 144 (the third parasitic body 144*a*) was 2.0 mm, and a transmission line 130 and 135 (the feeding portion) was formed to have a width of 0.5 mm. A width of the branched portion 146 was 0.8 (0.4 mm) relatively to a width of the feeding portion. A shortest distance between the branched portion 146 and the radiator 120 was adjusted to 0.8 mm.

Signal loss values (S-parameter; S11) depending on frequencies of the antenna structures of Comparative Example and Example were simulated using HFSS, and S11 graphs of FIGS. 8 and 9 were obtained.

Referring to FIGS. 8 and 9, in Comparative Example, a triple-band antenna was substantially implemented by the parasitic element. In Example, a peak intensity was more enhanced at a maximum resonance peak around 38-39 GHz by the addition of the branched portion.

Additionally, gain values at 28 GHz and 39 GHz of the antennas of Example and Comparative Example were measured using a radiation chamber. The results are shown in Table 1 below.

TABLE 1

| | Gain (dBi), 28 GHz | Gain (dBi), 39 GHz |
|---|---|---|
| Example | 9.23 | 8.38 |
| Comparative Example | 9.32 | 7.16 |

Referring to Table 1, as the branched portion was added to the parasitic element in Example, the gain value at 39 GHz was clearly increased while maintaining the gain at 28 GHz.

(2) Measurement of Antenna Gain According to a Spacing Distance of Branched Portion In the antenna structure of Example, antenna gains at 28 GHz and 39 GHz were measured for samples in which the shortest distance D1 (see FIG. 2) between the radiator and the branched portion was changed. The results are shown in Table 2 below.

TABLE 2

| Sample No. | Shortest Distance (D1) | Gain (dBi), 28 GHz | Gain (dBi), 39 GHz |
|---|---|---|---|
| 1 | 0.2 mm | 9.03 | 2.23 |
| 2 | 0.4 mm | 9.24 | 7.24 |
| 3 | 0.6 mm | 9.30 | 8.15 |
| 4 | 0.8 mm | 9.28 | 8.38 |
| 5 | 1.0 mm | 9.26 | 8.83 |
| 6 | 1.2 mm | 9.25 | 7.95 |
| 7 | 1.4 mm | 9.23 | 7.50 |

Referring to Table 2, when the spacing distance was 0.4 mm or more, the gain values commonly increased at 28 GHz and 39 GHz were obtained. The gain at 28 GHz was reduced as the spacing distance exceeded 1.0 mm. When the spacing distance exceeded 1.2 mm, the gain at 39 GHz was reduced.

(3) Measurement of Antenna Gain According to Line Width of Branched Portion

In the antenna structure according to the above-described Example, gains of 28 GHz and 39 GHz were measured while changing a ratio of the width of the branched portion relative to the width of the feeding portion (0.5 mm) of the transmission line within a range from 40% to 140%.

The results are shown in Table 3 below.

TABLE 3

| Sample No. | width of branched portion | ratio relative to width of feeding portion (%) | Gain (dBi), (28 GHz) | Gain (dBi), (39 GHz) |
|---|---|---|---|---|
| 1 | 0.2 mm | 40 | 9.30 | 7.95 |
| 2 | 0.3 mm | 60 | 9.26 | 8.60 |
| 3 | 0.4 mm | 80 | 9.26 | 8.83 |
| 4 | 0.5 mm | 100 | 9.25 | 8.80 |
| 5 | 0.6 mm | 120 | 9.19 | 8.55 |
| 6 | 0.8 mm | 140 | 8.25 | 7.59 |
| 7 | 1.0 mm | 160 | 7.98 | 7.68 |

Referring to Table 3, when the width of the branched portion was less than 60% of the width of the feeding portion, the gain at 39 GHz was reduced. When the width of the branched portion exceeded 120% of the width of the feeding portion, the gains at both 28 GHz and 39 GHz were reduced.

What is claimed is:

1. An antenna structure, comprising:

a dielectric layer;

an antenna unit array comprising a plurality of antenna units on a top surface of the dielectric layer, each of the antenna units comprising a radiator and a transmission line comprising a first transmission line and a second transmission line connected to the radiator in different directions; and a parasitic element disposed adjacent to the antenna units and electrically and physically separated from the antenna units, the parasitic element comprising:

a first parasitic element disposed between the first transmission line and the second transmission line included in the same antenna unit; and a second parasitic element disposed between the first transmission line and the second transmission line included in different neighboring antenna units, the second parasitic element comprising a branched portion adjacent to the radiators, the branched portion comprising a first branched portion and a second branched portion bent in different directions, and a shortest distance between the branched portion and the radiator is from 0.4 mm to 1.2 mm.

2. The antenna structure of claim 1, wherein the shortest distance between the branched portion and the radiator is from 0.4 mm to 1.0 mm.

3. The antenna structure of claim 1, wherein the antenna unit array comprises a first antenna unit and a second antenna unit adjacent to each other with the second parasitic element interposed therebetween; and the first branched portion is bent toward the second antenna unit, and the second branched portion is bent toward the first antenna unit.

4. The antenna structure of claim 3, wherein a shortest distance between the first branched portion and the radiator of the second antenna unit is from 0.4 mm to 1.2 mm, and a shortest distance between the second branched portion and the radiator of the first antenna unit is from 0.4 mm to 1.2 mm.

5. The antenna structure of claim 1, further comprising a third parasitic element adjacent to a lateral side of the antenna unit array.

6. The antenna structure of claim 5, wherein the third parasitic element comprises a single branched portion bent toward the radiator of an adjacent antenna unit.

7. The antenna structure of claim 1, wherein the radiator comprises convex portions and concave portions.

8. The antenna structure of claim 7, wherein the first transmission line and the second transmission line are connected to different concave portions among the concave portions.

9. The antenna structure of claim 8, wherein the first transmission line comprises a first feeding portion and a first bent portion extending from the first feeding portion to be connected to the radiator; and the second transmission line comprises a second feeding portion and a second bent portion extending from the second feeding portion to be connected to the radiator.

10. The antenna structure of claim 9, wherein a ratio of a width of the branched portion relative to a width of the first feeding portion or the second feeding portion is from 0.6 to 1.2.

11. The antenna structure of claim 9, wherein a ratio of a width of the branched portion relative to a width of the first feeding portion or the second feeding portion is from 0.7 to 0.9.

12. The antenna structure of claim 7, wherein the radiator has a four-leaf clover shape or a cross shape.

13. The antenna structure of claim 7, further comprising an auxiliary parasitic element adjacent to a concave portion to which the transmission line is not connected among the concave portions of the radiator, wherein the auxiliary parasitic element is electrically and physically separated from the radiator.

14. The antenna structure of claim 13, wherein the auxiliary parasitic element comprises a first auxiliary parasitic element and a second auxiliary parasitic element which face each other with a convex portion at an upper portion of the radiator among the convex portions interposed therebetween.

15. The antenna structure of claim 1, wherein the branched portion serves as a monopole antenna.

16. The antenna structure of claim 1, wherein the antenna structure is a multi-band antenna driven at a plurality of resonance frequencies in a range from 10 GHz to 40 GHz.

17. An image display device, comprising:

a display panel; and the antenna structure of claim 1 disposed on the display panel.

18. The image display device of claim 17, further comprising:

an intermediate circuit board comprising a feeding line electrically connected to the transmission line of the antenna structure;

a chip mounting board disposed under the display panel; and an antenna driving integrated circuit chip mounted on the chip mounting board to apply a feeding signal to the feeding line included in the intermediate circuit board.

19. The image display device of claim 18, wherein the parasitic element of the antenna structure is electrically separated from the intermediate circuit board.

* * * * *